United States Patent
Tanaka et al.

[19]

[11] Patent Number: 6,011,483
[45] Date of Patent: Jan. 4, 2000

[54] BATTERY BUILT-IN WIRELESS ID CARD UNIT AND ID VERIFICATION UNIT

[75] Inventors: Masahiko Tanaka; Kenji Okita, both of Tokyo, Japan

[73] Assignee: NEC Corporation, Tokyo, Japan

[21] Appl. No.: 08/791,220

[22] Filed: Jan. 31, 1997

[30] Foreign Application Priority Data

Feb. 6, 1996 [JP] Japan ................................. 8-019542

[51] Int. Cl.[7] .................................................. H04Q 1/00
[52] U.S. Cl. .............................. 340/825.31; 340/825.34; 340/825.54; 340/825.69; 340/825.72
[58] Field of Search ..................... 340/825.31, 825.69, 340/825.72, 825.34, 825.54

[56] References Cited

U.S. PATENT DOCUMENTS

| | | | |
|---|---|---|---|
| 4,354,189 | 10/1982 | Lemelson | 340/825.31 |
| 4,453,161 | 6/1984 | Lemelson | 340/825.31 |
| 4,897,644 | 1/1990 | Hirano | 340/825.31 |
| 4,926,332 | 5/1990 | Komuro et al. | 340/825.69 |

FOREIGN PATENT DOCUMENTS

| | | |
|---|---|---|
| 56-42458 | 4/1981 | Japan . |
| 1 451 832 | 2/1974 | United Kingdom . |

OTHER PUBLICATIONS

Keyless Entry System With Radio Card Transponder (I.E.E.E. Transactions on Industrial Electronics vol. 35, No. 2, May 1988, pp. 208–216.

*Primary Examiner*—Brian Zimmerman
*Assistant Examiner*—Yves Dalencourt
*Attorney, Agent, or Firm*—Scully, Scott, Murphy & Presser

[57] ABSTRACT

A battery built-in wireless ID card unit including a magnetic field detection section which generates an electromotive force from a received magnetic field to turn on a power switch of a built-in battery, and a control section which transmits an ID code by radio after the power switch is turned on, thereby turning off the power switch.

4 Claims, 1 Drawing Sheet

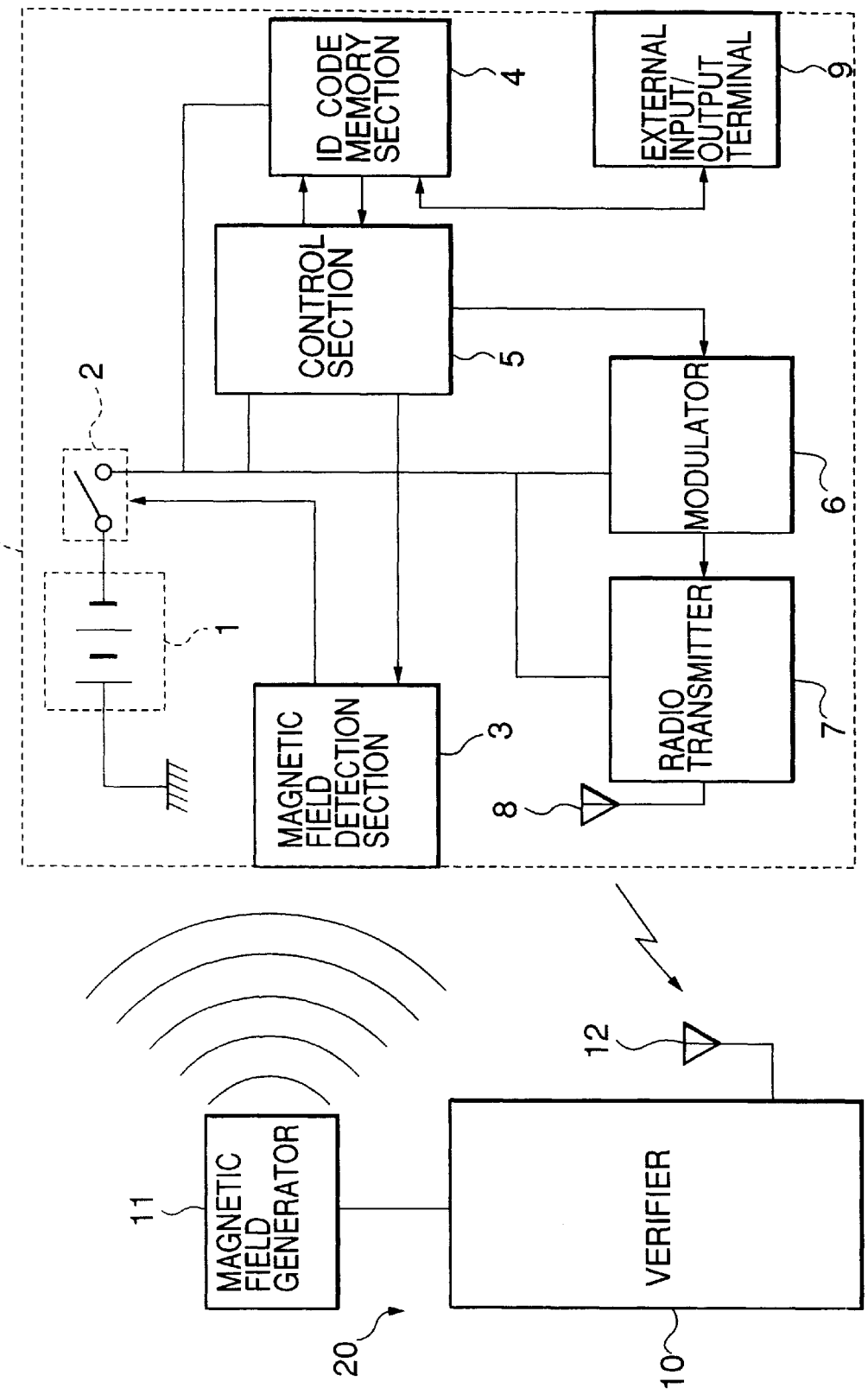

BATTERY BUILT-IN WIRELESS ID CARD UNIT AND ID VERIFICATION UNIT

BACKGROUND OF THE INVENTION

1. Field of the Invention

The present invention relates to a battery built-in wireless ID card unit and an ID verification unit therefor and, more particularly, to a battery built-in wireless ID card unit having an ideal battery saving function, and an ID verification unit therefor.

2. Description of the Prior Art

In a conventional battery built-in wireless ID card unit, a control section and the like are kept powered on and always held in an operative state, and part of the unit, e.g., a verification signal reception section or an ID signal transmission section is powered on/off at a predetermined period, thereby reducing the power consumption.

The conventional battery built-in wireless ID card unit employs the battery saving system for powering on/off only part of the unit at a predetermined period. With this arrangement, the remaining sections of the unit must always be set in the operative state, so no large current consumption reducing effect can be obtained.

SUMMARY OF THE INVENTION

The present invention has been made to solve the above problem, and has as its first object to provide a battery built-in wireless ID card unit having high battery saving performance, which turns on the power supply only when communication is required.

It is the second object of the present invention to provide a wireless ID verification unit which can further improve the battery saving performance of the battery built-in wireless ID card unit.

In order to achieve the first object, according to the first basic aspect of the present invention, there is provided a battery built-in wireless ID card unit comprising a magnetic field detection section which generates an electromotive force from a received magnetic field to turn on a power switch of a built-in battery, and a control section which is capable of an ID code after the power switch is turned on, and thereafter turning off the power switch.

The battery built-in wireless ID card unit described in the first basic aspect further comprises an ID code memory section and a radio transmission section, and wherein, in an ON state of the power switch, the control section reads out the ID code from the ID code memory section, and the radio transmission section transmits the ID code by radio.

The control section according to the first basic aspect can also transmit a control signal for stopping generation of the magnetic field via the radio transmission section by radio after the power switch is turned on.

In order to achieve the second object, according to the second basic aspect of the present invention, there is provided a wireless ID verification unit comprising a magnetic field generation section for transmitting a verification signal as a magnetic field, an antenna section for receiving a radio signal, and a verification section which detects, from the radio signal, an ID code and/or a stop control signal for stopping generation of the magnetic field, and stops generation of the magnetic field for a predetermined period of time.

According to the battery built-in wireless ID card unit of the present invention, the power supply is turned on only during the radio signal transmission period. Therefore, an ideal battery saving function can be realized, and the power consumption can be largely reduced.

In addition, according to the ID verification unit of the present invention, transmission of a verification signal is controlled. With this arrangement, an increase in current consumption caused by repeated response of the battery built-in wireless ID card unit can be prevented.

The above and many other advantages, features and additional objects of the present invention will become manifest to those versed in the art upon making reference to the following detailed description and accompanying drawings in which preferred embodiments incorporating the principles of the present invention are shown by way of illustrative example.

BRIEF DESCRIPTION OF THE DRAWINGS

The figure is a block diagram schematically showing the arrangements of a battery built-in wireless ID card unit and an ID verification unit according to an embodiment of the present invention.

DETAILED DESCRIPTION OF THE PREFERRED EMBODIMENT

An embodiment of the present invention will be described below with reference to the accompanying drawing.

The figure is a block diagram showing the arrangements of a battery built-in wireless ID card unit (to be referred to as an "ID card unit" hereinafter) according to an embodiment of the present invention and a wireless ID verification unit (to be referred to as an "ID verification unit" hereinafter) which verifies an ID code by the ID card unit, and receives and detects an ID code signal.

Referring to this figure, an ID verification unit 20 is placed at a gate, a door, a computer apparatus, or the like. The ID verification unit 20 is a unit for reading an ID code signal from an ID card unit 30 and comprises a verifier 10, a magnetic field generator 11, and a reception antenna 12. The magnetic field generator 11 transmits a magnetic field as a verification signal to the ID card unit always or except during a stop control operation. The verifier 10 receives a radio signal from the reception antenna 12 and detects the identification number or the like of the ID card unit of a card owner, thereby identifying the card owner.

The ID card unit 30 having data such as a person identification number and an attribute recorded therein incorporates a battery 1 and a plurality of signal processing blocks. A power from the battery 1 is supplied to the respective blocks via a main switch 2.

More specifically, the ID card unit 30 comprises a magnetic field detection section 3 for detecting an externally received magnetic field, the main switch section 2 which is ON/OFF-controlled depending on an output from the magnetic field detection section 3, an ID code memory section 4 to which a power is supplied from the battery via the main switch 2, a modulator 6 for modulating an ID code signal, a radio transmitter 7 for transmitting an output from the modulator 6 by radio, a control section 5 for controlling the entire ID card unit, a radio transmission antenna 8, and an external input/output terminal 9 for inputting/outputting data to/from the memory section.

The operation of this embodiment will be described below.

In this figure, the magnetic field generator 11 of the ID verification unit 20 placed at an appropriate detection portion of, e.g., a gate to detect the proximity of the ID card unit 30 or the owner of the ID card unit 30 generates a magnetic field.

When the owner of the ID card unit 30 approaches the magnetic field generator 11, or when the ID card unit 30 is made close to the magnetic field generator 11, the ID card unit 30 receives the magnetic field from the ID verification unit 20. A weak electromotive force is generated from the magnetic field detection section 3 in response to the magnetic field. Using this electromotive force, the main switch section 2 of the power supply battery 1 in the unit is switched to the ON state. With this operation, a current is applied to the circuit portions in ID card unit 30, which require power supply.

When the respective circuit portions in the ID card unit 30 are powered on, the control section 5 starts a control operation, designates the read address of an ID code in the ID code memory section 4, and reads out the ID code. The readout ID code is sent to the modulator 6. The modulator 6 modulates the ID code and sends the modulated signal to the radio transmitter 7. The radio transmitter 7 transmits, as a radio signal, the modulated signal of the ID code from the antenna 8 to the antenna 12 of the ID verification unit 20.

When the ID card unit 30 completes the radio signal transmission operation, the control section 5 recognizes the completion of transmission and other control operations, and controls the magnetic field detection section 3 or directly controls the main switch section 2 to switch the main switch 2 to the OFF state, thereby powering off the entire ID card unit 30.

The ID verification unit 20 receives, via the antenna 12, the radio signal transmitted from the ID card unit 30. The verifier 10 demodulates the ID code from the radio signal, determines and recognizes the ID code and the ID code owner on the basis of the ID data recorded in a table incorporated in the verifier 10 or the person's information to which the ID code is assigned, and outputs a control signal necessary for, e.g., opening the gate.

With the above arrangement and operation, the magnetic field detection section 3 and the external input terminal 9 require no power from the built-in battery power supply 1. In addition, since the remaining circuit portions are powered only during the operation period necessary for ID code transmission, the current consumption can be reduced to a necessary minimum level.

In this embodiment, the ID card unit 30 is started by a magnetic field and therefore may have an arrangement such that the power switch is turned on again after transmission of an ID code radio signal, and a similar operation is repeated. In this case, the control operation is performed to transmit the ID code signal as long as a magnetic field is detected. With this arrangement, the reliability can be prevented from being degraded due to a failure in ID code recognition by the verifier 10.

In a system coping with a case in which the owner of the ID card unit 30 stays near the magnetic field generator 11 of the ID verification unit 20 for a long period of time, the ID card unit 30 always receives the magnetic field. With the above arrangement, ID code signal transmission is repeated, so the battery power supply saving function cannot exhibit a sufficient effect. In such a case, it is preferable that transmission of the magnetic field from the magnetic field generator 11 be stopped for a predetermined period of time after the ID code signal is identified by the verifier 10. In addition, control may be performed by the control section 5 not to repeatedly transmit the ID code radio signal. For example, the ID code radio signal is transmitted from the ID card unit 30 a necessary number of times in the ON state of the built-in battery. At the same time, a control signal for stopping generation of the magnetic field on the ID verification unit 20 side is also transmitted by radio. With this arrangement, control is performed to stop transmission of the magnetic field from the magnetic field generator 11 for a predetermined period of time.

In the above embodiment, the respective sections of the ID card unit 30 are powered on/off at once. In place of this arrangement, a plurality of switches may be arranged. The necessary minimum circuit portions including the control section are powered on by the electromotive force from the magnetic field detection section 3. Thereafter, the necessary circuit portions are appropriately and sequentially powered on under the control of the control section. The power OFF operation is also performed in units of circuit portions after the respective necessary operations are completed. With this arrangement, a larger battery saving effect can be obtained.

In the above embodiment, the battery built-in wireless ID card unit 30 of the present invention has been described as an ID card. However, the form of the ID unit is not limited to the card. The main switch section 2 of the built-in battery may be constituted by a mechanical switch or an electronic switch such as a transistor which is operated by an electromotive force from the magnetic field detection section 3. In addition, when a manual switch for turning on/off the power supply is independently arranged in series with the main switch section 2, unnecessary ID code transmission can be effectively prevented, as a matter of course.

What is claimed is:

1. A battery built-in wireless ID card unit comprising:

a magnetic field detection section which generates an electromotive force from a received purely magnetic field to turn on a power switch of a built-in battery; and a control section which is capable of sending out an ID code after said power switch is turned on, and thereafter turning off said power switch.

2. A battery built-in wireless ID card unit according to claim 1, further comprising an ID code memory section and a radio transmission section, and wherein, in an ON state of said power switch, said control section reads out the ID code from said ID code memory section, and said radio transmission section transmits the ID code by radio.

3. A battery built-in wireless ID card unit according to claim 2, wherein said control section can also transmit a control signal for stopping generation of the purely magnetic field via said radio transmission section by radio after said power switch is turned on.

4. An ID card verification system, comprising:

a battery built-in wireless ID card unit having a magnetic field detection section which generates an electromotive force from a received verification signal in the form of a purely magnetic field to turn on a power switch of a built-in battery, and a control section which is capable of sending out an ID code and/or stop control code in the form of a radio signal after said power switch is turned on, and thereafter turning off said power switch; and a wireless ID verification unit having a magnetic field generation section for transmitting said verification signal, an antenna section for receiving said radio signal, and a verification section which detects, from said radio signal, said ID code and/or stop control signal for stopping generation of the verification signal for a predetermined period of time.

* * * * *